CONTROLLER HAVING FET BRIDGE CIRCUIT

Filed Sept. 20, 1965

INVENTOR.
Edward J. Miller, Jr.
BY
Mueller, Aichele & Rauner
ATT'Y.

United States Patent Office 3,435,375
Patented Mar. 25, 1969

3,435,375

CONTROLLER HAVING FET BRIDGE CIRCUIT

Edward J. Miller, Jr., Tempe, Ariz., assignor to Motorola, Inc., Franklin Park, Ill., a corporation of Illinois Filed Sept. 20, 1965, Ser. No. 488,457
Int. Cl. H03b 5/14, 5/42, 5/08
U.S. Cl. 331—110 7 Claims

ABSTRACT OF THE DISCLOSURE

A pair of field-effect transistors are utilized in a bridge circuit as a control element in a process controller. The FET's are biased to operate in the low triode region such that input signals set high resistances and operation is linear.

This invention relates to control elements for bridge circuits and in particular to the use of a field effect transistor as the control element.

The control elements of process controllers often incorporate bridge circuits which are used to measure variations between a set process parameter and a measured process parameter. When the bridge is unbalanced due to a difference between the set and measured process parameters, a control signal is generated which is used to change the process being controlled. The process change is made so as to minimize the difference between the set process parameter and the measured process parameter and thus rebalance the bridge. The control signal can be used directly or it can be further processed to provide the desired degree of control.

One or more of the impedance elements used in the arms of the bridge must be electronically controllable in order that the bridge may rapidly respond to changes in the process being controlled. The impedance elements used in the bridge should have a high input impedance in order that the bridge require as little power as possible from the measuring element and so that networks used to generate long time constant signals do not attenuate the input signals excessively. The impedance elements used in the bridge should have a low output impedance so that the bridge acts as a voltage source and is able to match the low input impedance of a transistor. The bridge should also have good stability and resettability. Varactors, which are commonly used as variable impedance elements, have low capacities so that the bridge must be operated at relatively high carrier or oscillating frequencies in order that the output impedance be sufficiently low for good performance. Operation of the bridge at high carrier or oscillating frequencies increases quadrature problems and the effect of stray capacitance.

It is therefore an object of this invention to provide a bridge for a process controller with improved stability and resettability and which is capable of operating at a relatively low carrier or oscillating frequency.

Another object of this invention is to provide a bridge for a process controller which has a high input impedance and a low output impedance.

A feature of this invention is the provision of a bridge for a process controller having at least one field effect transistor as a variable bridge element and in which the field effect transistor is operated in the triode region.

Another feature of this invention is the provision of a bridge for a process controller in which a field effect transistor biased to provide a constant resistance, is used as an element of one bridge arm for temperature stabilization of a field effect transistor used as a variable impedance element in a separate bridge arm.

This invention is illustrated in the drawings in which.

Figures 1, 2, 3, 4:
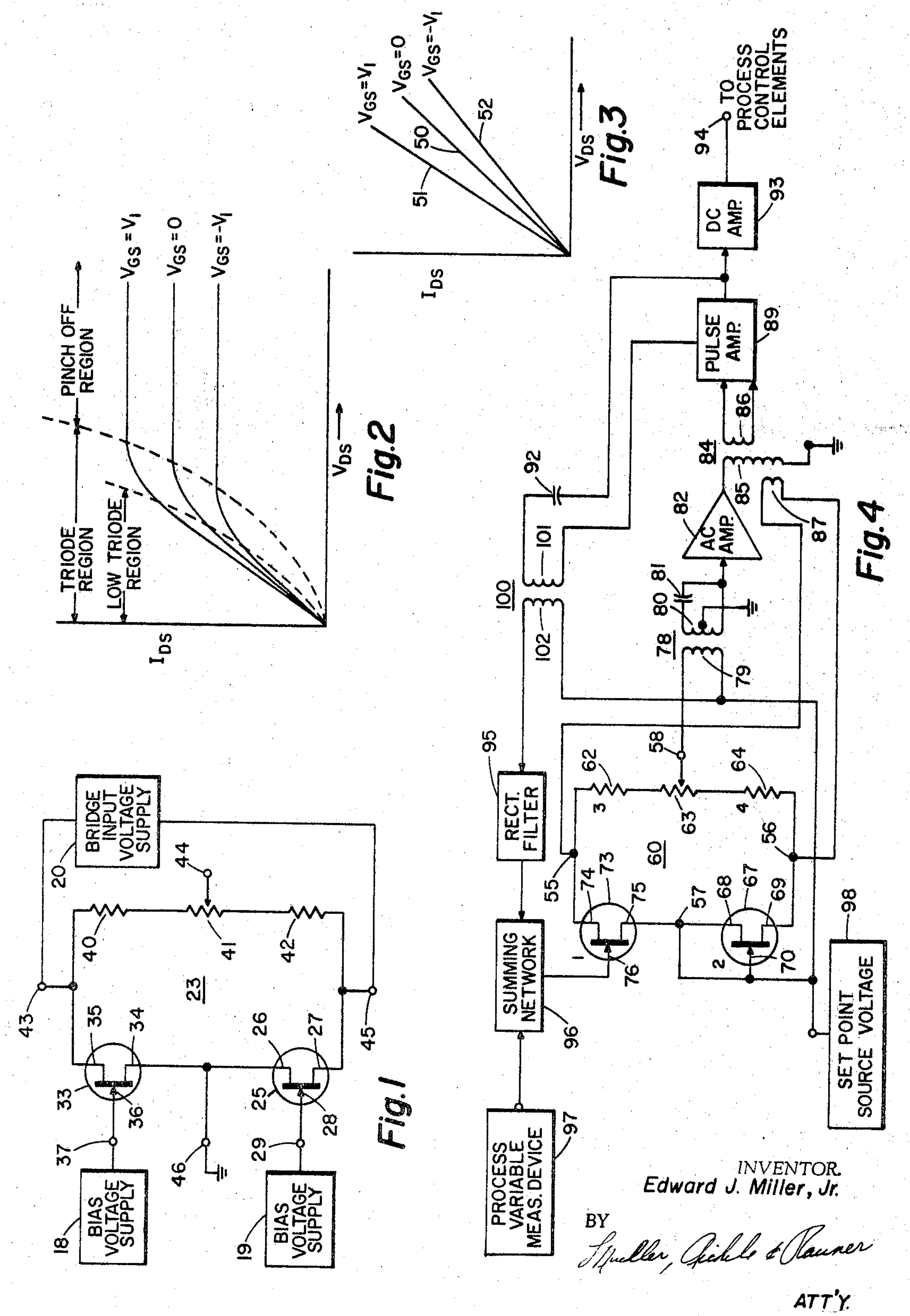
FIG. 1 is a schematic of a bridge in which two of the bridge arms incorporate field effect transistors as variable resistance elements.
FIG. 2 is a set of curves showing the drain to source current through a field effect transistor with variations in the drain to source and gate to source voltages.
FIG. 3 shows a portion of the curves of FIG. 2.
FIG. 4 is a partial schematic and partial block diagram of a process control circuit incorporating a bridge using field effect transistors.

In practicing this invention field effect transistors are used as the impedance elements in one or more of the arms of a bridge. By operating the field effect transistor in its triode region, and in particular the low portion of the triode region, a field effect transistor operates as a linear resistor. The value of the resistance of the field effect transistor can be controlled by varying the gate to source bias voltage. The field effect transistors can also be operated at a constant gate to source bias voltage thereby providing a fixed resistance. A field effect transistor having a constant gate to source bias voltage may be combined with a field effect transistor having a variable gate to source bias voltage to provide temperature stabilization of the bridge.

FIG. 1 illustrates a bridge which can be used as a control portion of a process controller. Field effect transistors 25 and 33 form two of the bridge arms. Resistor 40 and a portion of resistor 41 form the third arm and resistor 42 and the remaining portion of resistor 41 form the fourth arm. Resistor 41 is variable so that bridge 23 can be balanced to establish initial operating conditions. An input voltage applied to terminals 43 and 45 provides the drain to source voltage for each of the field effect transistors 25 and 33. Bias voltages for gate electrodes 28 and 36 are applied to terminals 29 and 37 respectively from bias voltage supplies 18 and 19. An input voltage, which may be direct current or alternating current, is coupled to terminals 43 and 45 from bridge input voltage supply 20. The output voltage from bridge 23 appears across terminals 44 and 46.

In FIG. 2 curves are shown which illustrate the variation in drain to source current ($I_{DS}$) of a field effect transistor with variations in the drain to source voltage ($V_{DS}$) for different gate to source bias voltage ($V_{GS}$). It can be seen from FIG. 3 that the curves can be divided into a pinch-off region wherein there is little or no variation in $I_{DS}$ with variations in $V_{DS}$ and a triode region in which there is a large variation in $I_{DS}$ as $V_{DS}$ is varied. The triode region shown in FIG. 3 includes a low triode region in which $I_{DS}$ is substantially a linear function of $V_{DS}$.

FIG. 3 is an enlarged portion of the low triode region of FIG. 2. The reciprocal of the slope of curve 50 represents a particular resistance presented by the field effect transistor between its drain and source electrodes with $V_{GS}$ equal to zero. Increasing $V_{GS}$ to $V_1$ will give curve 51 which is a lower resistance. Decreasing $V_{GS}$ to $-V_1$ will give curve 52 which is a larger resistance. Thus the resistance between the drain and source of a field effect transistor can be varied by varying the gate to source voltage.

Operation of a field effect transistor in the low triode region also reduces the amplitude of the input current to the bridge. This is important when high impedance, long time constant networks are used to couple the input signal to the bridge. Without the high input impedance capabilities of a field effect transistor operated in the low triode region, the voltage drop across high impedance networks coupling the input signal to the bridge could be excessive.

Referring again to FIG. 1, drain 35 of field effect transistor 33 is coupled to terminal 43 and drain 27 of field effect transistor 25 is coupled to terminal 45. Source 34 of field effect transistor 33 and source 26 of field effect transistor 25 are coupled to terminal 46. Thus field effect transistors 25 and 33 represent resistors which form two arms of bridge 23. An input voltage from input voltage supply 20 is applied to terminals 43 and 45. This input voltage is applied across field effect transistors 25 and 33 and is the $V_{DS}$ for these transistors. By maintaining $V_{DS}$ sufficiently low, field effect transistors 25 and 33 are operated in their triode region. Direct current voltages applied to terminals 29 and 37 provide bias voltages between the gate and source electrodes of field effect transistors 25 and 33 to establish the resistance of these field effect transistors at a desired value. Varying the direct current voltages applied to gate electrodes 28 and 36 from bias voltage supplies 18 and 19 varies the resistance presented by field effect transistors 25 and 33.

When operating in the low triode region the input current applied to the gate electrode of a field effect transistor, as for example the 2N3452, is in the pico ampere region. The output impedance of the bridge using these field effect transistors is of the order of 1000 ohms to 5000 ohms resistive. In other bridge circuits of this type, which use varactors as the variable bridge elements, the capacity of the varactors is of the order of 500 pf. In order to reduce the output impedance to the same order of magnitude, that is less than 5000 ohms, a bridge using varactors would have to operate at frequencies above 60 kc. p.s. A bridge using a field effect transistor as the variable impedance element can operate at frequencies of the order of 10 kc. p.s. since the bridge elements are resistive and the output impedance is not frequency dependent. Quadrature problems and stray capacitances are minimized by using the lower frequencies. The resettability of a controller using varactors as bridge elements varies from 1000 microvolts to 5000 microvolts over the temperature range from 20° C. to 50° C. while the resettability of a bridge using a field effect transistor such as the 2N3452 is approximately 300 microvolts over the same temperature range.

FIG. 4 is a partial schematic and partial block diagram of a bridge used with a process controller and incorporating field effect transistors as bridge elements. The output of the process controller may be used to control one or more process variables. Bridge 60 is a resistive bridge having resistor 62 and a portion of resistor 63 forming one arm of the bridge and resistor 64 and the other portion of resistor 63 forming a second arm of the bridge. Resistor 63 is a variable resistor which is adjusted to provide initial balance condition for the bridge. The other two resistive arms of the bridge consist of field effect transistors 67 and 73. Gate 70 of field effect transistor 67 is coupled to source electrode 68 so that the $V_{GS}$ of field effect transistor 67 is constant and equal to zero. With $V_{GS}$ constant the resistance of field effect transistor 67 is also constant. Field effect transistor 67 acts to provide temperature compensation in the circuit by offsetting variation in field effect transistor 73 due to changes in the ambient temperature. Gate 76 of field effect transistor 73 is coupled to summing network 96 which provides a direct current voltage to bias gate 76. Source 75 of field effect transistor 73 is coupled to terminal 57 of bridge 60. A direct current voltage from set point signal source 98 is applied to source 75 of field effect transistor 73. The voltage applied to gate 76 from summing network 96 is proportional to the status of the process variable being measured while the voltage from set point voltage source 98 is a measure of the desired status of the process variable being measured. Thus $V_{GS}$ for field effect transistor 73 is a measure of the difference between the desired status and the actual status of the process variable being measured.

In operation an alternating current voltage is applied to terminals 55 and 56 of bridge 60. If the bridge is unbalanced in one direction, an alternating current output voltage appears across terminals 57 and 58 and is coupled to alternating current amplifier 82 through a tank circuit consisting of secondary 80 of transformer 78 and tuning capacitor 81. The output of alternating current amplifier 82 appears across primary winding 85 of transformer 84. Secondary winding 87 couples a small portion of the voltage across primary winding 85 to terminals 55 and 56 and constitutes the input alternating current voltage to bridge 60. Thus bridge 60, transformers 78 and 84 and alternating current amplifier 82 form an oscillator when bridge 60 is unbalanced in the proper direction. The voltage applied to terminals 55 and 56 is of the order of 300 millivolts peak to peak and is divided between field effect transistors 67 and 73. Thus the drain to source voltage applied to field effect transistors 67 and 73 causes them to operate in their low triode regions where they act as resistors.

The output of secondary winding 86 of transformer 84 is coupled to pulse amplifier 89, filter capacitor 92 and direct current amplifier 93. Capacitor 92 is charged by the pulse current generated by the pulse amplifier 89. The output of DC amplifier 93 is coupled to process control elements which can change the process being controlled. Changing the amplitude of the direct current potential applied to a process control element will cause a change in the process and thus a change in the process variable signal received by summing network 96 from process variable measuring device 97.

The output of transformer 84 is coupled to pulse amplifier 89 to generate a pulse current which flows through primary 101 of feedback transformer 100. The pulse through primary 101 is coupled by secondary winding 102 to rectifier filter 95. The rectified signal from rectifier filter 95 is combined with the process variable signal in summing network 96 and the resultant direct current signal is applied to gate 76 of field effect transistor 73. The direct current signal from direct current amplifier 93 is applied to a process control element in such a manner that $V_{GS}$ of field effect transistor 73 is reduced to zero and thus bridge 60 is balanced. In practice bridge 60 will not be in exact balance and there will be a small alternating current output from terminals 57 and 58. The amplitude of this alternating current and the amount of residual unbalance can be made as small as desired by increasing the open loop gain of alternating current amplifier 82.

If bridge 60 is unbalanced in the other direction, the phase relations in the bridge will be reversed and the conditions necessary to sustain oscillation will not be present. In this case filter capacitor 92 will discharge and the output of the D.C. amplifier 93 will decrease thus changing the amplitude of the direct current signal applied to the process control elements. The change in amplitude of the direct current signal applied to the process control elements changes the process being controlled so as to restore the bridge to a balanced condition.

Thus a field effect transistor which can be electronically cotrolled has been provided as the variable element for a bridge arm. The field effect transistor when operated in its triode region is resistive and is not frequency dependent. The field effect transistor has a high input impedance and a low output impedance and it can be operated at low frequencies to minimize quadrature and stray capacitance problems.

I claim:

1. A controller, including the combination, a bridge circuit having four arms each with a separate impedance element positioned therein and at least one of said impedance elements including field-effect transistor means having a field electrode input portion and a signal path portion presenting an impedance affected by signals on said field electrode input portion, signal supply means coupled to said signal path portion, means for biasing said field-effect transistor means such that the impedance presented to any signal from said signal supply means as supplied to said signal path portion appears as an electrical resistance thereto such that the field-effect transistor means is continuously operated in its low triode region, circuit means adapted to receive a second signal and coupling same to said field electrode input portion, and said field-effect transistor means being responsive to said second signal to establish the value of said resistance.

2. A bridge circuit, including in combination, a bridge having four arms each with a separate impedance element positioned therein and with at least one of said impedance elements including field effect transistor means, said field effect transistor means having an input electrode, output electrode and a control electrode, signal supply means coupled to said input and output electrodes for applying a first signal thereto, the amplitude of said first signal being sufficiently small whereby said field effect transistor means operates in its low triode region and acts as a resistance to said first signal, circuit means adapted to receive a variable second signal and couple the same to said control electrode, said field effect transistor means being responsive to variations in the amplitude of said second signal whereby the value of said resistance is varied.

3. A bridge circuit, including in combination, a bridge having four arms each with a separate impedance element positioned therein and with at least one of said impedance elements including field effect transistor means having drain, source and gate electrodes, alternating current supply means coupled across said source and drain electrodes for applying an alternating current signal thereto, the peak amplitude of said alternating current signal being sufficiently small whereby said field effect transistor means operates in its low triode region and acts as a resistance to said alternating current signal, circuit means adapted to receive a direct current signal and couple the same to said gate electrode, said field effect transistor means being responsive to the amplitude of said direct current signal to establish the value of said resistance.

4. A bridge circuit, including in combination, a bridge having four arms each with a separate impedance element positioned therein, one of said impedance elements including a first field effect transistor and another of said impedance elements including a second field effect transistor, signal supply means coupled to said first and second field effect transistor means for applying a first signal thereto, the amplitude of said first signal being sufficiently small whereby said first and second field effect transistors operate in their low triode regions and act as resistances to said first signal, first circuit means adapted to receive a second signal and couple the same to said first field effect transistor, second circuit means adapted to receive a third signal and couple the same to said second field effect transistor, said first field effect transistor means being responsive to said second signal to establish the value of said resistance of said first field effect transistor and said second field effect transistor being responsive to said third signal to establish the value of said resistance of said second field effect transistor.

5. A bridge circuit, including in combination, a bridge having first, second, third and fourth arms having first, second, third and fourth impedance elements respectively, said first and third arms being coupled together and said second and fourth arms being coupled together to form a pair of input terminals, said first and second arms and said third and fourth arms being coupled together to form a pair of output terminals, said first impedance element including a first field effect transistor having a drain electrode coupled to one of said input terminals, a source electrode coupled to one of said output terminals and a gate electrode, said second impedance element including a second field effect transistor having a drain electrode coupled to the other of said input terminals, a source electrode coupled to said one output terminal and a gate electrode, bias circuit means adapted to receive a predetermined bias potential and couple the same to said gate and source electrodes of said second field effect transistor, alternating current supply means coupled to said input terminals to apply an alternating current signal to said drain and source electrodes of said first and second field effect transistors, the peak amplitude of said alternating current signal being sufficiently small whereby said first and second field effect transistors operate in their low triode regions and act as resistances to said alternating current signal, said second field effect transistor being responsive to the amplitude of said predetermined bias potential to establish the value of said resistance of said second field effect transistor, and control circuit means coupled to said gate electrode of said first field effect transistor and adapted to receive a direct current control signal, said first field effect transistor being responsive to the amplitude of said control signal to establish the value of said resistance of said first field effect transistor.

6. A bridge circuit, including in combination, a bridge having four arms each with a separate impedance element positioned therein and with at least one of said impedance elements including a field effect transistor, said bridge further having an opposing pair of output terminals and an opposing pair of input terminals, alternating current amplifying means having an input circuit coupled to said output terminals and an output circuit coupled to said input terminals, said alternating current amplifying means and said bridge forming an oscillator circuit whereby an alternating current signal is applied to said input terminals and to said field effect transistor, the peak amplitude of said alternating current signal being sufficiently small whereby said field effect transistor operates in its triode region and acts as a resistance to said alternating current signal, control circuit means coupled to said field effect transistors and adapted to receive a control signal, said field effect transistor being responsive to said control signal to establish the value of said resistance.

7. A bridge circuit, including in combination, a bridge having first, second, third and fourth arms having first, second, third and fourth impedance elements respectively, said first and third arms being coupled together and said second and fourth arms being coupled together to form a pair of input terminals, said first and second arms and said third and fourth arms being coupled together to form a pair of output terminals, said first impedance element including a first field effect transistor having a drain electrode coupled to one of said input terminals, a source electrode coupled to one of said output terminals and a gate electrode, said second impedance element including a second field effect transistor having a drain electrode coupled to the other of said input terminals, a source electrode coupled to said one output terminal and a gate electrode, bias circuit means adapted to receive a predetermined bias potential and couple the same to said gate and source electrodes of said second field effect transistor, alternating current amplifying means having an input circuit coupled to said output terminals and an output circuit coupled to said input terminals, said alternating current amplifying means and said bridge forming an oscillator circuit whereby an alternating current signal is applied to said input terminals and to said drain and source electrodes of said first and second field effect transistors, the peak amplitude of said alternating current signal being sufficiently small whereby said first and second field effect transistors operate in their low triode regions and act as resistances to said alternating current signal, said second field effect transistor being responsive to the amplitude of said predetermined bias potential to establish the value of said resistance of said second field effect transistor, control circuit means coupled to said gate electrode of said first field effect transistor and adapted to receive a direct current control signal, said first field effect transistor being responsive to the amplitude of said control signal to establish the value of said resistance of said first field effect transistor.

References Cited

UNITED STATES PATENTS 2,956,234 10/1960 Olsen.
3,281,718 10/1966 Weberg ---------- 307—251 X
3,317,850 5/1967 Hilbiber ---------- 307—304 X

OTHER REFERENCES

Electronics, May 3, 1965 (pp. 60 and 61).

JOHN S. HEYMAN, *Primary Examiner.*

D. D. FORRER, *Assistant Examiner.*

U.S. Cl. X.R.

307—241, 251, 304; 323—75; 330—72; 331—138, 172; 332—47